(12) United States Patent
Stock

(10) Patent No.: US 11,067,214 B2
(45) Date of Patent: Jul. 20, 2021

(54) ENCLOSED HOSE END THREAD PROTECTOR

(71) Applicant: Derek R Stock, Valrico, FL (US)

(72) Inventor: Derek R Stock, Valrico, FL (US)

(*) Notice: Subject to any disclaimer, the term of this patent is extended or adjusted under 35 U.S.C. 154(b) by 22 days.

(21) Appl. No.: 16/574,164

(22) Filed: Sep. 18, 2019

(65) Prior Publication Data

US 2020/0088342 A1 Mar. 19, 2020

Related U.S. Application Data

(60) Provisional application No. 62/732,732, filed on Sep. 18, 2018.

(51) Int. Cl.
*F16L 57/00* (2006.01)
*B65D 59/06* (2006.01)

(52) U.S. Cl.
CPC ............ *F16L 57/005* (2013.01); *B65D 59/06* (2013.01)

(58) Field of Classification Search
CPC ........ F16L 57/005; B65D 59/06; B65D 59/00

USPC .................. 138/96 T, 98, 109, 89
See application file for complete search history.

(56) References Cited

U.S. PATENT DOCUMENTS

| | | | | |
|---|---|---|---|---|
| 1,049,752 A | * | 1/1913 | McMurtrie | H02G 3/02 174/82 |
| 5,004,016 A | * | 4/1991 | Kliewer | B65D 59/06 138/110 |
| 5,228,823 A | * | 7/1993 | Crook | B62D 33/042 104/111 |
| 5,706,860 A | * | 1/1998 | Gonyea | B65D 59/06 138/89 |

* cited by examiner

*Primary Examiner* — Patrick F Brinson
(74) *Attorney, Agent, or Firm* — GrayRobinson, P.A.

(57) ABSTRACT

Hose end protector intended to be carried on the end of a hose so as to surround and completely enclose the threaded coupling for its protection. The protector includes an elastic body having been secured by a retaining ring on a solid fitting adapted to engage with the hose. The fully enclosed protector protects the threaded coupling from damage, prevents debris and small objects from entering hose, and provides a method of diffusing flow, and is used as a means of handling hose.

10 Claims, 5 Drawing Sheets

ENCLOSED HOSE END THREAD PROTECTOR

CROSS-REFERENCE TO RELATED APPLICATIONS

This application claims priority to provisional application No. 62/732,732 filed Sep. 18, 2018, the disclosure of which is incorporated by reference herein.

BACKGROUND OF THE INVENTION

Field of the Invention

The invention relates to coupling protectors and more particularly a protector adapted to attach to the end of a threaded hose for multiple uses; for protection of the threaded coupling without interference, for protection from objects and debris from entering hose, for diffusing of fluids exiting hose, and for ease of handling hose.

Description of the Background Art

In the normal use of a hose, the male threaded end is exposed to damage from various causes. Often a hose is reeled at the source of storage, dragging the exposed threads across the ground, often across asphalt or concrete. Damage to the threads results in difficulty in connecting couplings, poor sealing for its use causing leakage, and damage to female threads of other equipment usually necessitating replacement.

Hoses with an exposed end are exposed to debris and small animals or insects that may enter the hose when not in use. When an attachment such as a sprayer is then threaded on the hose before use all the objects are pushed inside attachment upon use and the obstructions then restrict flow rendering the attachment useless.

Diffusing or spreading of fluid flow may be desired at times, such as watering of plants, or filling of wash buckets without excessive velocity as to create foam. Similar devices for diffusing of fluids exist but are a specific attachment for such use. Such attachments do not have the capability to be a "pass through" to other attachments and are not universal in their use.

Hoses are most often pulled to the area of need. The pulling of hosing can often create undue wear and tear by bending or kinking of hose during pulling.

Therefore, it is an object of the invention to include a solid fitting which has a connection portion having internal threads mate-able with the threads of the threaded coupling so that detachable securement is produced there between.

Another object of the invention is to have an elastic body secured to the solid fitting.

Another object of the invention using the elastic body is to prevent debris, insects, and small animals from entering the hose.

Another object of the invention using the elastic body is allowing the diffusion of fluid flow when desired and eliminating the need to add a specific attachment to do so.

Another object of the invention using the elastic body is having the capability of being pulled or tugged to the area of use.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a an enclosed hose end thread protector with multiple uses ranging from protecting the threads located on a hose-type mechanism to allowing an unobstructed flow of water out of the system.

The invention comprises an elastic body that encloses the end of a fitting or a threaded end of a hose. Access to the fitting is achieved by the design having a slit in the top which responds to hand pressure applied lengthwise to provide a substantial opening for access to threads as well as free flow of fluids if so desired. Due to the elastic nature of the body when access to the threads is not needed and hand pressure is released, the elastic body returns to its closed position while maintaining protection of the male threads from damage.

The elastic body maintains closure when not in use to prevent objects from entering the hose when not in use, and then allowing unobstructed flow when another attachment is secured to end of hose and attempt at use is made.

Diffusion of water or other fluids is achieved through perforations in the elastic body. The elastic body is durable enough to remain closed from fluid flow but opens when hand pressure is applied. By allowing fluid flow without hand pressure applied the fluid is diffused through perforations.

Further, the rugged design and shape of the thread protector acts as a "T-Handle" reducing wear and tear on hose by avoiding bending or kinking of hose during pulling. The T-handle guides the user to pull the hose in tension thus reducing any bending moments and undesired stress on hose.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
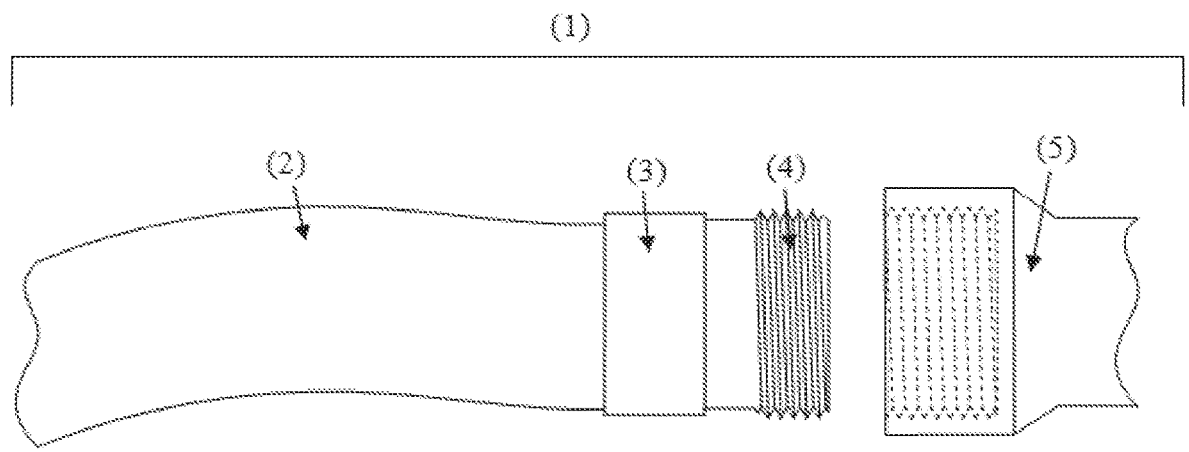
FIG. 1 is a front elevational view of a standard male hose with standard female fitting.

Referring to FIG. 1, a conventional hose assembly 1 is illustrated, which usually includes a flexible hose 2 having a metal coupling 3 attached. The metal coupling 3 includes a terminating end having external, hose threads 4 integrally formed with the metal coupling 3. The hose threads 4 are intended to receive a female fitting 5 having a female coupling carried on its one end so as to thread-ably engage with the hose threads 4. By means of this conventional construction, the flexible hose 2 may supply pressurized fluid to the discharge end via the metal coupling 3 when the female fitting 5 is not attached thereto. When the female fitting 5 is attached as described, the fluid discharge is through the end of the female fitting 5. However, when the female fitting 5 has been detached, the hose threads 4 are subject to damage as previously described. The internal body of the flexible hose 2 is also subject to objects entering through the open end of the metal coupling 3. The present invention protects the threads and the entire coupling assembly both external and internally.

Figure 2:
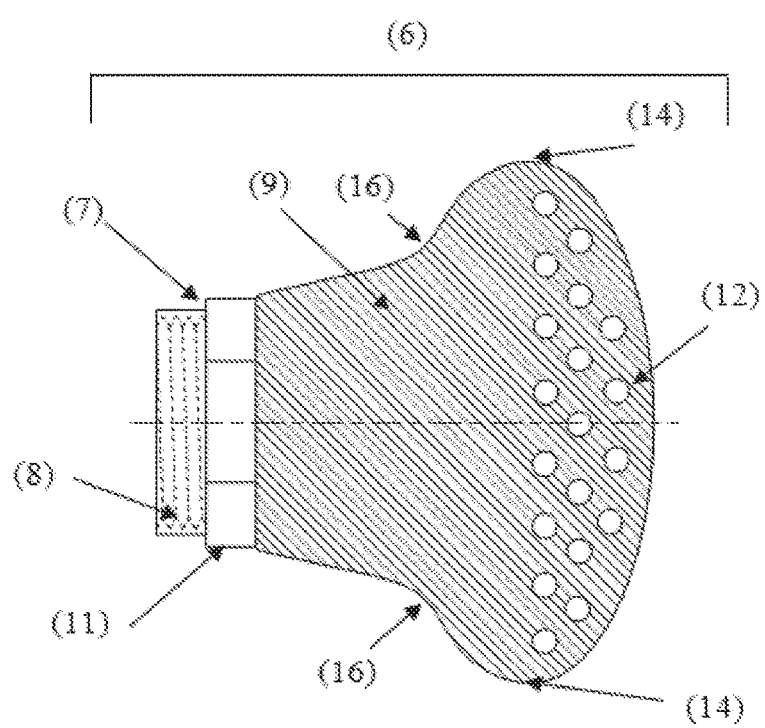
FIG. 2 is a front elevational view of the thread protector assembly showing the male threaded end in a covered state, not engaged with another fitting.
Figure 3:
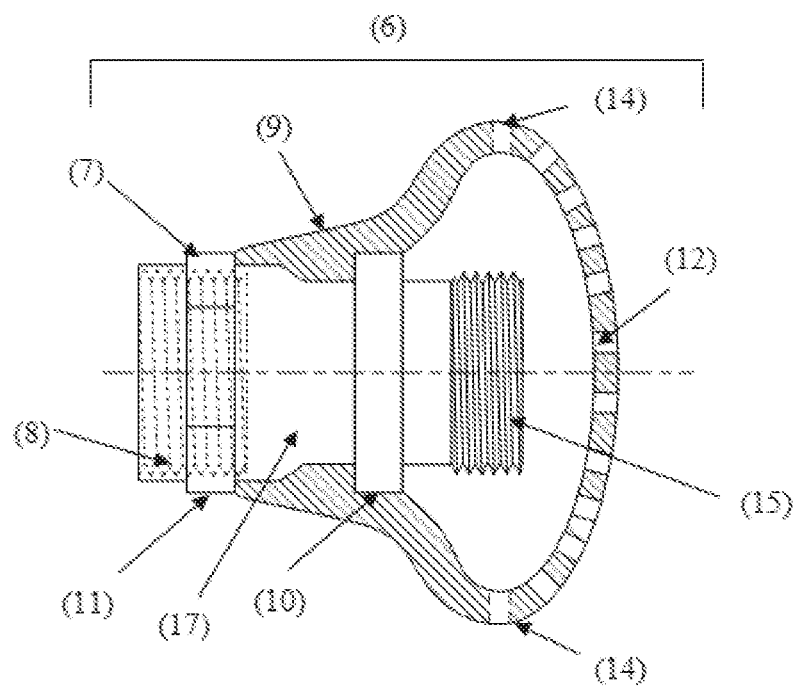
FIG. 3 is a longitudinal cross-sectional view of the thread protector showing the male threads in the covered state, not engaged with another fitting.
Figure 4:
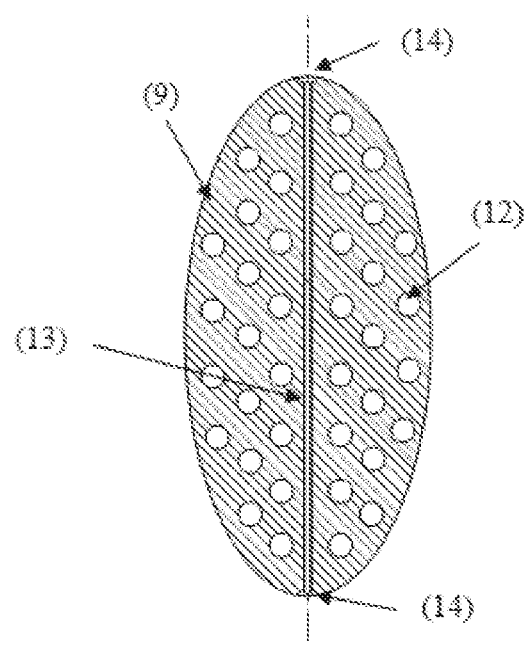
FIG. 4 is a plan view of the thread protector in a closed state showing perforations.
Figure 5:
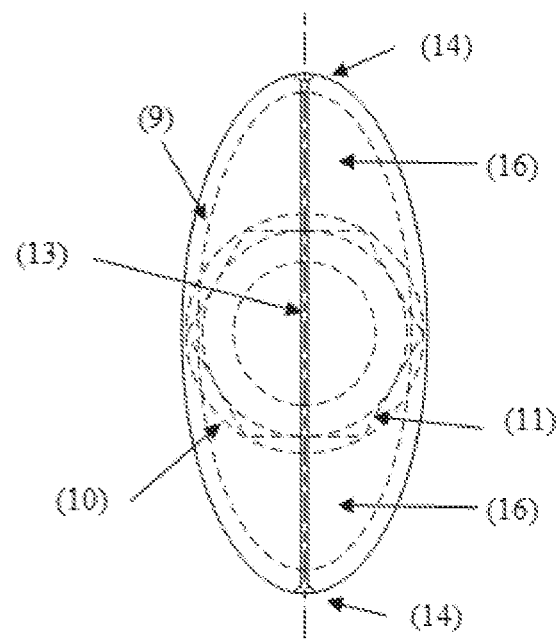
FIG. 5 is a plan cross-sectional view of the thread protector in the closed state showing integration to male fitting orientation.

Referring now in detail to FIGS. 2 and 3, a preferred embodiment of the present invention is illustrated wherein a hose end protector 6 is illustrated. The protector 6 includes a base fitting 7 having a plurality of flat surfaces constituting a grasping means 11, which has a hexagonal configuration so that the protector 6 may be removably connected onto the hose threads 4 associated with the metal coupling 3. For this purpose, the base fitting 7 includes internal threads 8, which thread-ably engage with the hose threads 4.

Figure 6:
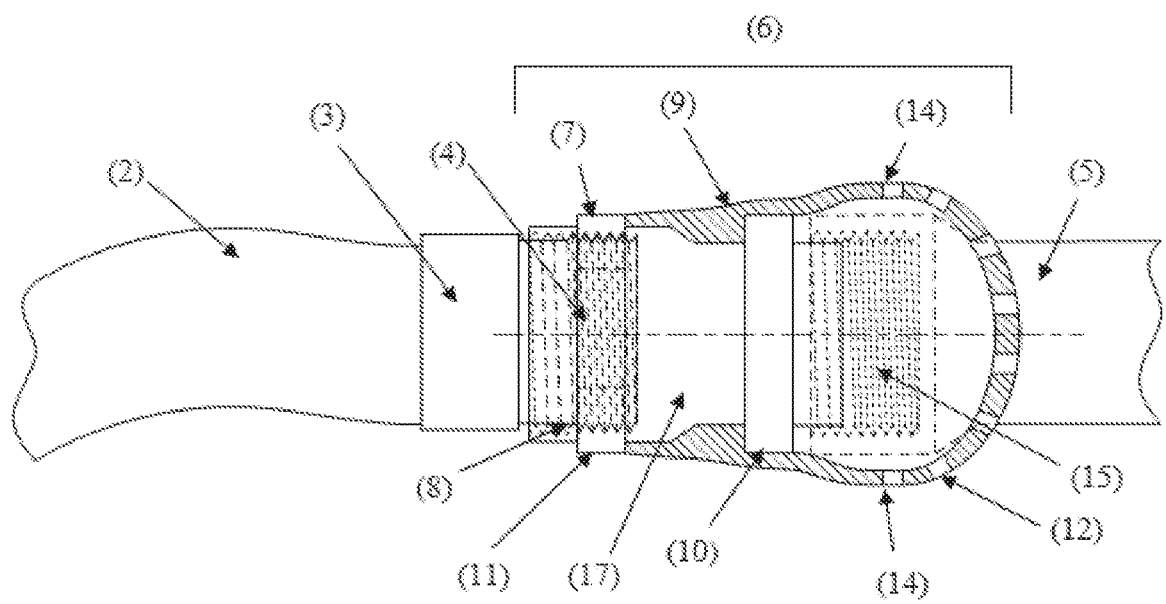
FIG. 6 is a longitudinal cross-sectional view of the thread protector showing the threads engaged with another fitting with the thread protector in an open state surrounding coupling.
Figure 7:
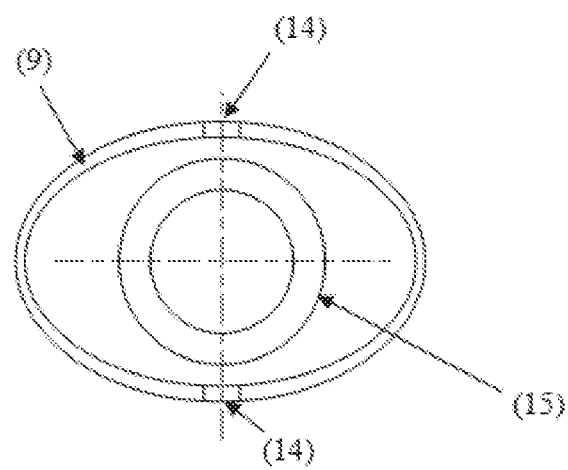
FIG. 7 is a plan view of the thread protector assembly compressed to the open state.
Figure 8:
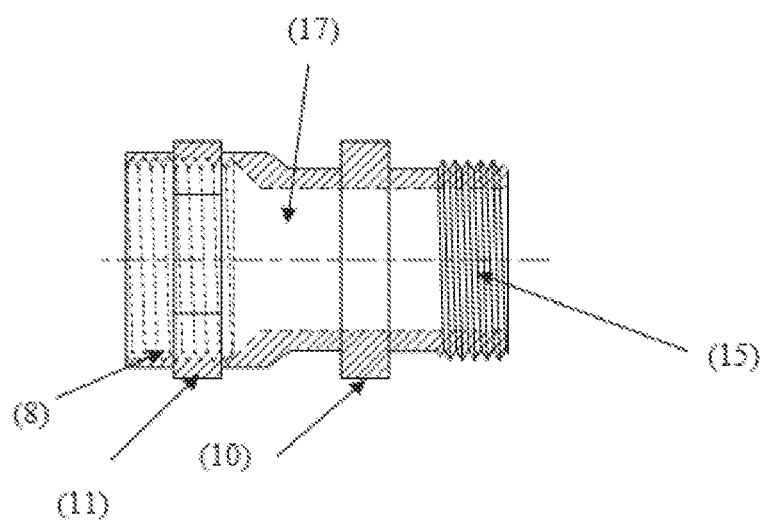
FIG. 8 is a central longitudinal cross-sectional view of the solid threaded fitting with integral hex and retaining ring.
Figure 9:
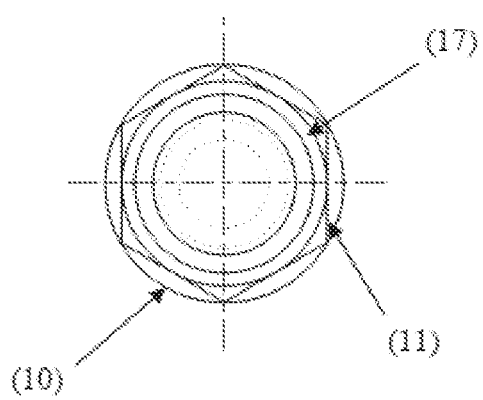
FIG. 9 is a plan view of the solid threaded fitting with integral hex and retaining ring.

The protector 6 includes an elastic body 9 and core 17 which is secured by an integral retaining ring 10 in FIGS. 3, 5, 6, 8 and 9, respectively. The elastic body 9 as previously discussed, is composed of a thin wall, and is intended to retain full closure to prevent debris and wildlife from entering the flexible hose 2. The thin wall of the elastic body 9 may be composed of any traditional material used in the industry and is rigid enough to retain its shape without applied external forces, yet dynamic enough to become elastic upon applied external forces. Perforations 12 on the protector 6 diffuse fluid flow so the pressurized stream may be diffused when desired without the need of a separate attachment. A slit 13 allows the enclosed elastic body to be fully opened. Locations to apply hand pressure to open elastic body and allow free flow of pressurized fluid or access for threading on attachment are represented by axis 14. FIG. 7 depicts the protector 6 in complete open state that would occur from said hand pressure fully exposing the threaded male fitting 15 to provide access to unobstructed fluid flow or access for threading on female fitting 5. FIG. 7 also depicts a plan view of the surface of the slit 13. FIG. 6 represents the protector 6 fully engaged to a female fitting 5 through opened elastic body 9 covering the engagement area.

Lastly, the protector embodiment as previously stated acts as a "T-Handle" for ease of handling. The locations where one would grip the protector to move hosing is represented by gripping location 16.

To assure a proper seal between the protector 6 and the metal coupling 3, a suitable washer may be disposed about the passageway within the internal threads 8 so that the extreme circular edge of the metal coupling 3 may bear against the washer and seal against a shoulder integrally formed within the base fitting 7. No reduction of fluid pressure is experienced since the bore of the base fitting 7 is substantially the same as the fluid passageway or bore of the flexible hose 2.

In view of the foregoing, it can be seen that the embodiment of the present invention provides a novel protection means for completely enclosing the normally exposed threads of a hose connector whereby the threads are isolated from encounter with rigid or hard surfaces that would normally gall, pit or distort the external threads. The embodiment provides a novel protection against debris, and small objects from entering hose. The embodiment also provides a readily accessible method of diffusing flow. Lastly the embodiment provides a novel means of handling the hose.

The various embodiments provide for the protector 6 to be fabricated in a two-piece arrangement: A single elastic embodiment that conforms to a single rigid fitting. The protector 9 would be used for attachment with the flexible hose 2 as original equipment or as a single piece which may be sold as a separate unit and attached to the existing flexible hose 2 construction by the user. Also, the elastic body 9 may be provided separately as a replacement to an existing base fitting 7, or alternatively, a base fitting 7 provided as a replacement to the existing elastic body 9. A suitable washer may be provided between the terminating end of the hose connector and the protector.

Now that the invention has been described,

What is claimed is:

1. An enclosed hose end thread protector for threaded connection to a threaded male fitting of a hose, comprising in combination:
   a base fitting comprising a core having a distal end and a proximal end, said proximal end of said core including a threaded female fitting for connection to the threaded male fitting of the hose, said distal end including a threaded male fitting; and
   an elastic body having a distal end and proximal end, said distal end comprising a thin wall with perforations enclosing said distal end of said core allowing water flowing from the hose to exit therefrom, said thin wall comprising an elongated slit that when opened, allows access to the threaded male fitting of said core for threaded connection to a female threaded fitting of another device.

2. The enclosed hose end thread protector of claim 1, wherein said base fitting includes a retaining ring.

3. The enclosed hose end thread protector of claim 1, wherein said elastic body is removably connected to said base fitting.

4. The enclosed hose end thread protector of claim 1, wherein said distal end of said elastic body comprises a bulbous configuration.

5. A method of connecting a hose to an enclosed hose end thread protector comprising the steps of:
  grasping the enclosed hose end protector at a gripping location;
  the enclosed hose end protector comprising:
  a base fitting comprising a core having a distal end and a proximal end, said proximal end of said core including a threaded female fitting for connection to the threaded male fitting of the hose, said distal end including a threaded male fitting;
  an elastic body having a distal end and proximal end, said distal end comprising a thin wall with perforations enclosing said distal end of said core allowing water flowing from the hose to exit therefrom, said thin wall comprising an elongated slit that when opened, allows access to the threaded male fitting of said core for threaded connection to a female threaded fitting of another device;
  opening the elastic body at the slit; and
  connecting the hose to the threaded male fitting.

6. The enclosed hose end thread protector of claim 5 wherein the base fitting includes a retaining ring.

7. The enclosed hose end thread protector of claim 5 wherein the elastic body is removably connected to the base fitting.

8. The enclosed hose end thread protector of claim 5 wherein the elastic body further includes a bulbous distal end.

9. A protector for encompassing a threaded male fitting of a hose comprising in combination:
  an elastic body having a distal end and proximal end, said distal end comprising a thin wall with perforations allowing water flowing from the hose to exit therefrom, said thin wall further comprising an elongated slit that when opened, allows access to the threaded male fitting for threaded connection to a threaded female fitting of another device.

10. The enclosed hose end thread protector of claim 9, wherein said distal end of said elastic body comprises a bulbous configuration.

\* \* \* \* \*